July 9, 1946.    G. W. RUDA    2,403,554
METHOD AND DEVICE FOR DETERMINING THE DEFLECTION OF ROTATING BODIES
Filed Sept. 21, 1943

INVENTOR
Gustaf Wilhelm Ruda
BY
Busser and Harding
ATTORNEYS.

WITNESS:
Rob't R. Kitchel

Patented July 9, 1946

2,403,554

UNITED STATES PATENT OFFICE 2,403,554

METHOD AND DEVICE FOR DETERMINING THE DEFLECTION OF ROTATING BODIES

Gustaf Wilhelm Ruda, Stockholm, Sweden, assignor to Aktiebolaget Separator, Stockholm, Sweden, a corporation of Sweden Application September 21, 1943, Serial No. 503,228
In Sweden November 5, 1942

10 Claims. (Cl. 73—66)

For balancing bodies rotating at high speed a considerable number of auxiliary devices have been brought into existence. None of these, however, has proved reliable and simple enough regarding its design to have been made use of more than to a limited extent. Anyway, this applies to centrifugal technics.

The balancing of a centrifugal bowl is as a rule carried out in such a way that the bowl is brought into rotation at a high speed, whereupon the operator holds a colored crayon pencil against that part of the bowl or the bowl spindle, the deflection of which is to be determined. In this way is produced a remaining mark indicating the direction of the deflection and, in a certain degree, also its magnitude. Guided by the mark or marks, heavy material in the form of tin solderings is fixed to the bowl after it has been taken to pieces. As, however, the place or places in which to fix the material as well as the size of the same is determined by means of estimation, the method does not imply more than a rather rough correction of the imperfect balancing. In practice, the process will therefore have to be repeated several times in order to give a satisfactory result. Nevertheless, the balancing according to this method will not be so accurate as would be desirable. A chief cause of the not quite satisfactory result lies in the imperfect indication of the balancing fault. The magnitude of the state of non-equilibrium may certainly be estimated to a certain extent by the length of the line made by the crayon, but chiefly this is possible only in the case of small faults in the equilibrium and, besides, the length of the line also depends on the pressure exerted by the pencil.

According to the present invention an exact indication of the unbalance as regards its magnitude and location is obtained by means of a microscope. The principle consists in applying marks to the side of the rotating body and in observing these thru a microscope, adjusted so as to give a sharp optical image. This means an exactly determined distance between the objective of the microscope and that portion of the surface of the body which forms the mark.

As, with a body rotating at high speed, the mark appears to the observer as a line, crossing the field of vision and having the same thickness as the extension of the mark in the direction of the axis of rotation, the image of the mark can be focussed sharply only regarding its upper and lower outlines (in the case of a vertical axis of rotation). The mark is therefore advantageously made in the form of a point or a line along the periphery of the body. A line will stand forth more conspicuously in the field of vision of the microscope than a point of identical height and, therefore, a line is preferably chosen in practice. It must not, however, cover any considerable portion of the periphery of the body, as the main point is the sharpness of the image and same depends on the distance of the mark from the object glass and, consequently, from the axis of rotation. Only a short line is practically everywhere at the same distance from the axis of rotation and, consequently, from the microscope, when the body is rotating eccentrically or makes a deflection respectively.

By observing in the microscope a mark in the form of a stroke on the side of the rotating body and reading off the radial position of the objective, the distance of the mark from the objective can thus be exactly determined. By so doing, however, the balancing fault has not been indicated, neither with regard to its magnitude nor to its position. With the object in view, a series of marks are applied along the periphery of the body. If these were on the same axial level, they would float together in the microscope and appear as a single line, and it would thus be impossible to distinguish them from one another. In order to make it possible to distinguish the different marks, they should be placed on different axial levels, and advantageously along a helical line. Each of the marks will then form a line in the field of vision of the microscope, so that the same is divided into a number of parallel lines corresponding to the marks. As each line has a given vertical position, a given level of altitude in the field of vision corresponds to each of the marks on the body. By gradually focussing the different lines to attain maximum sharpness of the image and reading off the radial position of the objective, the difference between the radial distance of the marks can be determined.

In this way is obtained a method of determining which portion of the periphery of the rotating body is farthest away from the axis of rotation and which portion is nearest. Thus, the direction of the deflection relative to the rotating body is determined. At the same time a measure of the magnitude of the deflection is obtained, as this is half the difference between the greatest and the smallest distance from the axis.

It is true that no exact determination of the magnitude and the direction of the deviation has been made as yet, as the direction does not, of course, always pass thru one or some of the marks but oftener between them. If a sufficiently great number of marks is used, the errors of determination due to the above circumstance will, however, be very small. Besides, it is possible to interpolate between the values for two adjacent marks, the errors thereby being reduced to an insignificant order of magnitude.

It is desirable that the marks are not placed at a greater axial distance from each other than that all the strokes or at least all those lying on the one half of the periphery come within the field of vision of the microscope. The direction and magnitude of the deviation can then be determined without vertical displacement of the microscope.

For complete indication of the balancing faults of a rotating body, observations are necessary on two axial levels being at a comparatively great distance from one another. The microscope should therefore be movable parallelly with the axis of rotation. Besides, it should, of course, admit of fine adjustments for reading off all the lines in the vicinity of the same axial level. Alternatively, two or more microscopes may be used, one for each level of altitude.

In order that the marks shall stand out as conspicuously as possible in the field of vision of the microscope, they should be in sharp contrast with the surrounding surface. They may for instance be bright and glossy, whereas the surrounding surface is dull, for instance sooted. Further the surface observed thru the microscope should be strongly illuminated.

For indicating the balancing faults of not quite cylindrical bodies, for instance centrifugal bowls, it may be advantageous to apply to the same an additional body which is correctly balanced and intended to bear the marks.

Guided by the data obtained thru the indication, the size and position of two weights of correction can be calculated. When balancing a great number of similar bodies, e. g. centrifugal bowls, it may be advisable to make out a table indicating the correlation between the results of indication and the correction-weights.

It has proved possible by using this method of indication to attain a considerably better balancing than when using the method of pencil-indication usually applied heretofore.

For executing the indication according to the invention a device is required in which the body can be brought into rotation and which comprises a microscope placed in a fixed position relative to the body. The accompanying drawing shows by way of example one embodiment of such a device.

Figure 1:
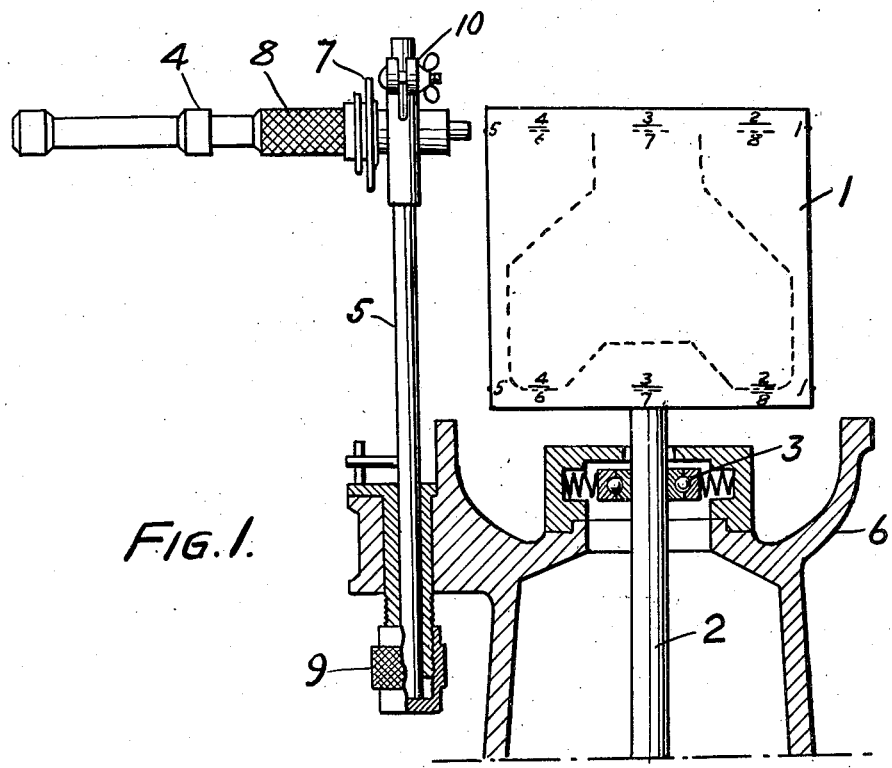
Fig. 1 is a side view, partly in section, of one of my balancing outfits with a centrifugal bowl and a supplementary part therein.

The rotatable body 1 is here supposed to consist of a centrifugal bowl fitted with an additional part and in the ordinary way suspended on or otherwise carried by a vertical spindle 2 of a centrifugal machine, the spindle being supported in a frame 6 by means of an elastic top bearing 3. In the frame 6 a rod 5, holding a microscope 4, is supported. The microscope should be removable to a considerably lower portion of the holder 5 for indication further down on the body 1. Such adjustment of the microscope can be effected by loosening the clamp 10, which directly carries the microscope, and sliding the clamp on the rod 5, or by turning the nut 9 to lift the rod 5 or allow it to be lowered. The distance of the objective of the microscope from the body 1 is adjusted by turning the sleeve 8, which means micrometrical adjustment. The turning, and consequently the displacement, may be read off on a disc 7, graduated in a suitable manner so that the displacement may be read off, for instance, in hundredths of a millimeter.

Figure 2:
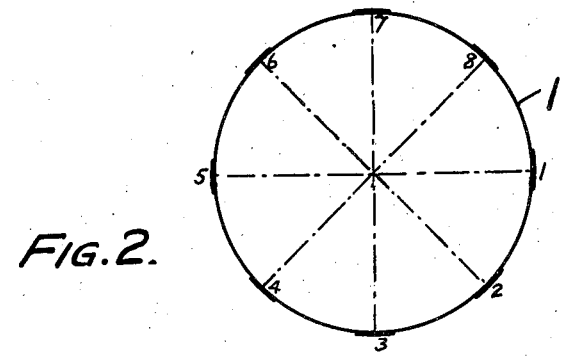
Fig. 2 illustrates the positions at which marks may be placed around a part to be balanced.

On the body 1 there are eight marks 1 to 3 in the form of lines evenly distributed around the periphery of the body as shown in Fig. 2. The marks will then be at an angular distance of 45° from each other. Further, the marks should be placed along a helical line with No. 1 uppermost, No. 2 somewhat below and so forth. As set out in the preceding, it will be possible with this arrangement to localize the different marks in the microscope. All the lines should preferably be visible simultaneously in the microscope; however, for convenient handling it is sufficient that, for instance, the marks 1—5 or 3—7 respectively can be observed simultaneously, for then there are always lines representing the greatest and the smallest distance visible at the same time in the field of vision of the microscope, and it is possible, without having to change the level of altitude of the microscope, to determine the maximum difference between the distances from the axis and thus the magnitude as well as the direction of the deflection in relation to the body. In order to make this determination it is only necessary to turn the sleeve 8 until the lines get sharp contours. If the microscope is displaced from without and inwards, the first mark appearing in the form of a sharp line is farthest away from the axis of rotation and thus indicates the direction of the deflection. The diametrically opposite mark then lies nearest to the axis of rotation. After the angular position of the sleeve 8 has been read off on the disc 7 at the point, where the first mark appeared sharply and the sequence of the same reckoned from above has been ascertained, the sleeve 8 is again turned in the same direction. The other marks now appear as sharp images each in its turn until the diametrically opposite one is reached. When this stands out sharply, the position of the sleeve 8 in relation to the disc 7 is again read off and the difference between the two values is noted down. The magnitude of the deflection and the marks thru which the deflection takes its direction (possibly the marks lying nearest to the direction of the deflection) have thus been determined. Guided by these indications the necessary weights of correction may then be fixed to the body in suitable places.

What I claim and desire to protect by Letters Patent is:

1. The herein described method of determining the degree of deflection of a not precisely balanced rotating body by microscopical observation along radii of said body, which comprises applying a plurality of arcuately spaced apart marks around the periphery of said body in different planes normal to the axis of said body, rotating the body and while it is rotating adjusting the microscope radially to give sharp optical images of one after another of each of said marks, and determining, by means of a previously graduated scale attached to the microscope, the differences of the distances between the microscope and those parts of the peripheral surface of the body to which said marks are applied.

2. The herein described method of determining the deflection of a not precisely balanced rotating body by microscopical observation along radii of said body, which comprises applying at each end of a zone between two substantially axially displaced circumferences a set of arcuately spaced apart marks around the periphery of said body at different axial levels substantially coincident with the spaced apart sections of one turn of a continuous helix, adjusting the microscope axially to first one and then the other of said sets of marks and, while in each position, and with the body rotating, adjusting it radially to give sharp optical images of one after another of the successive different marks in the set being observed, and determining, by means of a previously graduated scale attached to the microscope from which its movement may be read, the difference between the maximum and minimum radial distances from marks to the microscope.

3. The herein described method of determining the degree of deflection of a not precisely balanced rotating body by microscopical observation along a radius of said body, which comprises applying a plurality of marks arcuately spaced around the body and in planes at different axial levels, altering the adjustment of the microscope while the body is rotating to give sharp images of the marks on the periphery of the body spaced the greatest and least distance from the axis of rotation of the body, measuring the distances between the positions of said microscope from which sharp images were observed, noting the vertical positions of the marks on the periphery which were brought into sharp focus and therefrom determining the circumferential location of the marks, and calculating the deflection from the different distances between the microscope and the periphery of the body to give sharp images.

4. A device for the determination of the deflection of a rotatable body comprising means, including a resiliently supported rotatable shaft, for supporting and rotating said body, a hollow cylinder mounted on said shaft and having an outer surface concentric with the body, a set of marks arcuately spaced around the cylinder, at different axial positions coincident with the spaced apart sections of one turn of a continuous helix, a fixed support, a microscope adjustably mounted on said support and having its axis radial to the body, said microscope being adjustable radially relative to the body for successive focusing upon said marks, and a calibrated scale by which the radial movement of the microscope between successive focusing positions can be accurately determined.

5. A device for the determination of the deflection of a rotatable body comprising means, including a resiliently supported rotatable shaft, for supporting and rotating said body, a hollow cylinder mounted on said shaft and having an outer surface concentric with the body, two sets of marks substantially axially spaced apart and arcuately spaced around the cylinder, at different axial positions coincident with the spaced apart sections of one turn of a continuous helix, a fixed support, a microscope adjustably mounted on said support and having its axis radial to the body, said microscope being adjustable radially relative to the body for successive focusing upon said marks, a calibrated scale by which the radial movement of the microscope between successive focusing positions can be accurately determined and means for adjusting the microscope axially from one set of marks to the other.

6. A device for the determination of the deflection of a cylindrical body having on its surface a set of marks arcuately spaced around the body at different axial positions coincident with the spaced apart sections of one turn of a continuous helix comprising means, including a resiliently supported rotatable shaft, for supporting and rotating the body, a fixed support, a microscope adjustably mounted on said support and having its axis radial to the body, said microscope being adjustable radially relative to the body for successive focusing upon said works, and a calibrated scale by which the radial movement of the microscope between successive focusing positions can be accurately determined.

7. A device for the determination of the deflection of a cylindrical body having on its surface two sets of marks substantially axially spaced apart and arcuately spaced around the body at different axial positions coincident with the spaced apart section of one turn of a continuous helix comprising means, including a resiliently supported rotatable shaft, for supporting and rotating the body, a fixed support, a microscope adjustably mounted on said support and having its axis radial to the body, said microscope being adjustable radially relative to the body for successive focusing upon said marks, a calibrated scale by which the radial movement of the microscope between successive focusing positions can be accurately determined and means for adjusting the microscope axially from one set of marks to the other.

8. A device for determining the deflection of a rotating body comprising, a fixed frame, a resilient support mounted on the frame and adapted to rotatably support a body to be tested, said support including a cylindrical surface concentric with said body and adapted to rotate therewith, said cylindrical surface being provided with marks spaced apart around its periphery in different planes normal to the axis of said body, a microscope, means to mount the microscope on the frame so that the line of vision through the microscope is along a line radial of said axis, means to adjust said microscope in a radial direction to thereby focus it so that maximum sharpness of each of the images of said marks may be attained one after another while the body is rotating and a scale cooperating with the microscope for determining the radial movement of the microscope and thereby the deflection of the body when rotating.

9. The herein described method of determining the direction and magnitude of the deflection of a not precisely balanced rotating body by microscopical observation along radii of said body, which comprises applying at each end of a zone between two substantially axially displaced circumferences a set of arcuately spaced apart marks around the periphery of said body, at different axial levels, substantially coincident with the spaced apart sections of one turn of a continuous helix, adjusting the microscope axially to first one set of marks and, while the body is rotating, adjusting the microscope radially to give sharp images of the marks on the periphery of the body spaced the greatest and least distance for the axis of rotation of the body, measuring the distances between the positions of said microscope from which sharp images were observed, noting the vertical positions of the marks on the periphery which were brought into sharp focus and therefrom determining the circumferential location of the marks, then shifting the microscope to the plane of the other set of marks and repeating the process.

10. The herein described process of determining the location and magnitude of weights to correct the unbalance of a rotating body by microscopical observation along radii of said body, which comprises applying at each end of a zone between two substantially axially displaced circumferences a set of arcuately spaced apart marks around the periphery of said body, at different axial levels, substantially coincident with the spaced apart sections of one turn of a continuous helix, adjusting the microscope axially to first one set of marks and, while the body is rotating, adjusting the microscope radially to give sharp images of the marks on the periphery of the body spaced the greatest and least distance from the axis of rotation of the body, measuring the distances between the positions of said microscope from which sharp images were observed, noting the vertical positions of the marks on the periphery which were brought into sharp focus and therefrom determining the circumferential location of the marks, then shifting the microscope to the plane of the other set of marks and repeating the process and, from the data thus determined, calculating the location and magnitude of a weight to be added to each zone.

GUSTAF WILHELM RUDA.

Certificate of Correction

Patent No. 2,403,554.

July 9, 1946.

GUSTAF WILHELM RUDA

It is hereby certified that error appears in the printed specification of the above numbered patent requiring correction as follows: Column 6, line 11, claim 6, for the word "works" read *marks*; and that the said Letters Patent should be read with this correction therein that the same may conform to the record of the case in the Patent Office.

Signed and sealed this 15th day of October, A. D. 1946.

[SEAL]

LESLIE FRAZER,
*First Assistant Commissioner of Patents.*